United States Patent [19]

Erlenkämper et al.

[11] Patent Number: 4,676,098

[45] Date of Patent: Jun. 30, 1987

[54] VESSEL FOR BULK MATERIALS

[75] Inventors: Siegbert Erlenkämper, Bad Vilbel; Jürgen Eisenblätter, Bad Homburg, both of Fed. Rep. of Germany

[73] Assignee: Batelle - Institut e.V., Frankfurt, Fed. Rep. of Germany

[21] Appl. No.: 767,755

[22] Filed: Aug. 21, 1985

[30] Foreign Application Priority Data

Aug. 21, 1984 [DE] Fed. Rep. of Germany ....... 3430717

[51] Int. Cl.⁴ .............................................. G01F 23/28
[52] U.S. Cl. ...................... 73/290 V; 141/95
[58] Field of Search ............. 73/290 V, 227; 340/621; 367/908; 141/95

[56] References Cited

U.S. PATENT DOCUMENTS

| | | | |
|---|---|---|---|
| 2,668,365 | 2/1954 | Hogin | 73/290 V X |
| 2,990,543 | 6/1961 | Rod | 340/621 |
| 3,079,596 | 2/1963 | Atkinson | 73/290 V |
| 3,930,405 | 1/1976 | Renken, Jr. | 73/587 |
| 4,144,766 | 3/1979 | Wehrmeister | 73/587 |
| 4,194,199 | 3/1980 | Sheperd et al. | 340/754 |

FOREIGN PATENT DOCUMENTS

| | | | |
|---|---|---|---|
| 0634467 | 2/1962 | Italy | 73/290 V |
| 12860 | 1/1977 | Japan | 73/290 V |
| 0208636 | 5/1983 | Japan | 73/40.5 A |
| 0809681 | 3/1959 | United Kingdom | 367/908 |

*Primary Examiner*—Daniel M. Yasich
*Attorney, Agent, or Firm*—Birch, Stewart, Kolasch & Birch

[57] ABSTRACT

A vessel for bulk materials is described whose level can be continuously determined from outside during the filling or emptying process. To this end, at least one AE (acoustic emission) transducer is mounted at each of the levels of the vessel which determine full or empty states. An acoustic waveguide is provided between the two AE transducers defining full and empty states. Preferably, however, the vessel wall serves as an acoustic waveguide. The AE transducers are connected with an electronic signal processing unit which determines the movement of the bulk material by localization from the difference between the arrival times of the signals generated by friction noises of the bulk material at the acoustic waveguide, which are detected by the two AE transducers.

10 Claims, 8 Drawing Figures

VESSEL FOR BULK MATERIALS

BACKGROUND AND SUMMARY OF THE INVENTION

The present invention relates to a vessel for bulk materials, whose level can be continuously determined from outside during the filling or emptying process.

In general, the level of bulk materials in upressurized vessels can be read directly from a measuring rod or, in the case of pressurized or thermally loaded vessels, from an inspection glass. In both cases the remote transmission of the directly read measured values is difficult to implement. To avoid these drawbacks, an indirect measuring method can be used. In this case, the attention of X-radiation or radioactive radiation in the bulk material is used to determine its level. In the latter case, remote transmission can be implemented without major difficulty, but this require extensive safety measures in addition to structural modifications of the vessel to adapt it for the respective transmitters and receivers.

The object of the present invention therefore is to develop a vessel for bulk materials which permits rapid and defined remote monitoring of the level of filling without requiring structural modifications.

This object can be achieved according to the present invention by providing, a generic term for devices which change mechanical/electrical energy in response to sonic and ultra sonic frequencies, at least one AE (acoustic emission) transducer at each of the levels defining full and empty states of the vessel and by providing at least one acoustic waveguide at the wall of the vessel between the two AE transducers defining full and empty levels, and by connecting the AE transducers with an electronic signal processing unit.

The wall of the vessel advantageously serves as an acoustic waveguide. The external wall of the vessel is provided with at least two AE transducers at the upper and lower ends of the region to be monitored, and the friction noises generated by the moving bulk materials at the wall of the vessel are carried by the vessel, as a waveguide, to the two transducers, the signals are evaluated as AE signals by means of the connected electronic signal processing unit. The movement of the bulk material can thus be determined by localization from the difference between the arrival times of the signals detected by the two AE transducers. The individual locations are represented in a histogram or a pulse summation curve. The start or the end of the histogram or of the pulse summation curve indicates the level of the bulk material during filling or emptying of the vessel. The level indication which is generated by the moving bulk material and stored can be recalled in the state of rest of the bulk material.

Further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention is described in detail on the basis of the drawings, wherein FIGS. 1(a) and (b) show the vessel according to the prsent invention in an empty and filled state, respectively.

DETAILED DESCRIPTION OF THE INVENTION

Figure 1A:
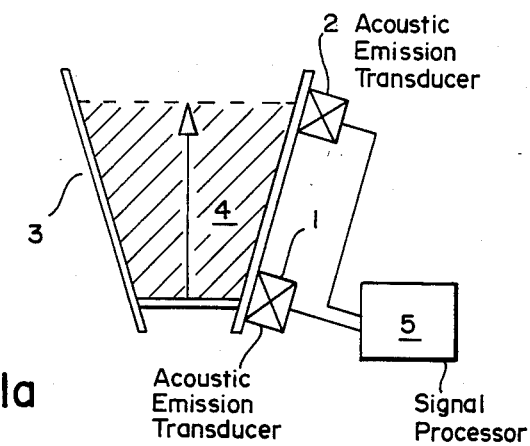

FIGS. 1(a) and (b) show two AE transducers 1 and 2 installed at the external wall of the vessel 3. In this embodiment the wall of the vessel serves as an acoustic waveguide. The lower AE transducer 1 is positioned at the level of empty state of the vessel, whereas the position of AE transducer 2 corresponds to full state. In the following, the empty state is designated by $X_L$ and the full state by $X_H$.

The acoustic signals generated by friction of the bulk material 4 at the wall of the vessel are detected by the AE transducers 1 and 2, converted into electrical signals and subsequently processed in an electronic evaluation unit 5.

Figure 2A:
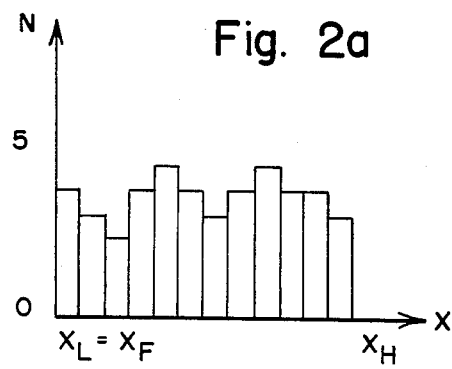
FIGS. 2(a) to (f) present the histograms or the pulse summation curves for determining the level of filling.
Figure 2B:
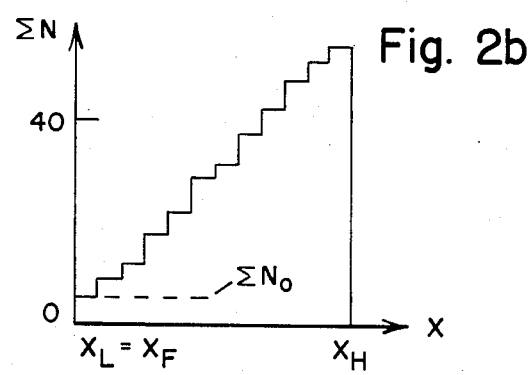
Figure 2C:
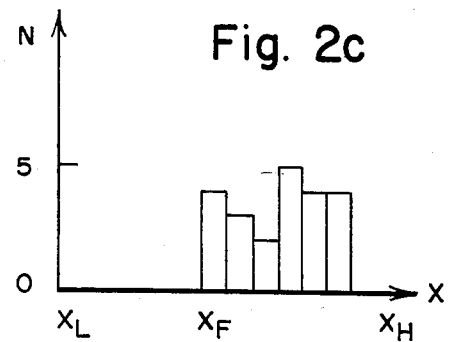
Figure 2D:
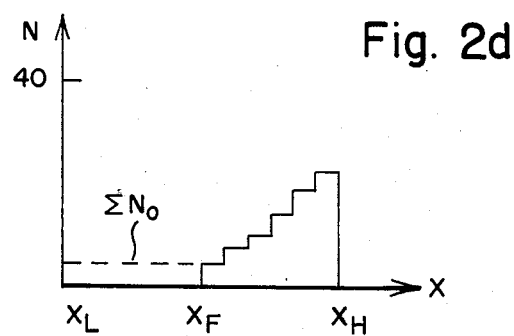

FIG. 1(a) shows the case of an empty vessel being filled. In this case the bulk material that moves along on the wall of the vessel generates friction noises over the entire height of the vessel, which are indicated in FIG. 2(a) as a histogram, e.g. of the number N of events localized along the vessel wall X. According to FIG. 2(b), the summation curve $\Sigma N$ is obtained from this histogram by summing up the events N localized along the vessel wall X. By means of this summation curve, the level $X_F$ of the bulk material is determined as exceeding of a given discriminator threshold. This first level $X_F$ can be documented, for example, with the aid of a printer. After documentation, the summation curve is cancelled, so that the friction noises that are generated during the further filling process only in the upper region of the wall, as shown in FIG. 2(c) become obvious as a lower limit of the localized events, i.e. as temporary level $X_F$. This new level $X_F$ is likewise determined by the exceeding of the discriminator threshold $\Sigma N_o$ by the summation curve $\Sigma N$, as results from FIG. 2(d).

Figure 1B:
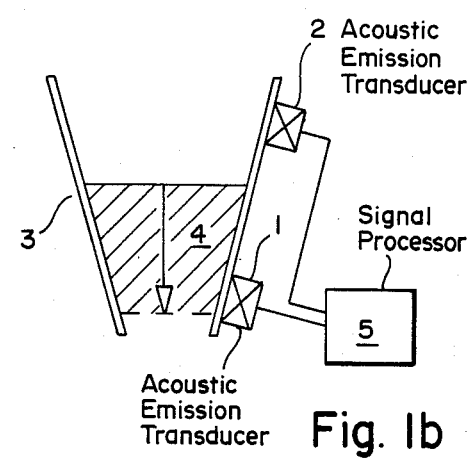
Figure 2E:
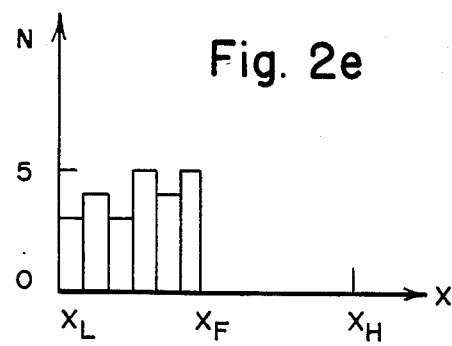

If a half-filled vessel according to FIG. 1(b), for example, is emptied, friction noises are generated only by the material flowing down from the lower vessel region which is still filled. Therefore the localization histogram of FIG. 2(e), in contrast to the filling process, localizes, the upper limit corresponding to the temporary level $X_F$.

Figure 2F:
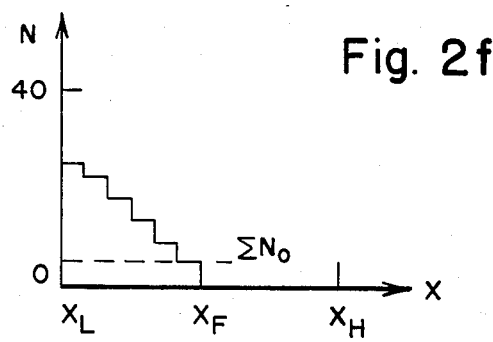

This contrast to the filling process indicates that it is advantageous to reverse the summation curve $\Sigma N$, now starting at the $X_H$ value. If this measure is taken, the temporary level $X_F$ is determined from exceeding the $\Sigma N_o$ threshold as in the case of the filling process, as is shown in FIG. 2(f).

The level of the discriminator threshold $\Sigma N_o$, the duration of the measurement periods and the optimum AE transducer type depend essentially on the ratio of useful: interfering signals.

The invention being thus described, it will be obvious that the same may be varied in many ways. Such variations are not to be regarded as a daparture from the spirit and scope of the invention, and all such modifications as would be obvious to one skilled in the art are intended to be included within the scope of the following claims.

We claim:

1. A device for measuring a level of a bulk material in a vessel during a filling or emptying process in accordance with acoustic signals produced by the bulk material during the filling or emptying process, the level of said material moving through a range of levels in the vessel, said device comprising:

first acoustic emission transducer means disposed on an external surface of a wall of the vessel at a location that is indicative of a full level within the vessel, for receiving the acoustic signals and producing a first electrical signal corresponding to the acoustic signals received and containing information with respect to the actual level of bulk material within said range of levels;

second acoustic emission transducer means disposed on the external surface of said wall of the vessel at a location that is indicative of an empty level within the vessel, for receiving the acoustic signals and producing a second electrical signal corresponding to the acoustic signals received and containing information with respect to the actual level of bulk material within said range of levels;

acoustic waveguide means, connected between said first acoustic emission transducer and said second acoustic emission transducer and acoustically coupled to said bulk material, for carrying the acoustic signals containing information with respect to the actual level of bulk material within said range in said vessel, said acoustic signals being carried from the bulk materials to the first and second acoustic emission transducer means, said wall of the vessel forming, an acoustic waveguide means; and electrical signal processing means, connected to said first and second acoustic emission transducer means for evaluating the first and second electrical signals to determine the actual level of the bulk material within the vessel.

2. The device of claim 1 wherein said electrical signal processing means produces a histogram from the first and second electrical signals, said histogram indicating the level of bulk material in the vessel.

3. The device of claim 1 wherein the acoustic signals are produced by friction or impingement noise of the bulk material, during filling or emptying, against said acoustic waveguide means.

4. The device of claim 3 wherein said acoustic waveguide means includes an internal wall of the vessel that corresponds to a portion of the external wall of the vessel between the first and second acoustic emission transducer means.

5. The device of claim 1 wherein said first and second acoustic emission transducers passively detect the acoustic signals.

6. A device for measuring the level of a bulk material in a vessel during a filling or emptying process, said material moving through a range of levels in the vessel, wherein the bulk material produces acoustic signals by friction or impingement noise of the bulk material against an internal wall of the vessel, comprising:

first acoustic emission transducer means, disposed on an external surface of a wall of the vessel at a location that is indicative of a full level within the vessel, for receiving the acoustic signals and producing a first electrical signal corresponding to the acoustic signals received;

second acoustic emission transducer means, disposed on the external surface of said wall of the vessel at a location that is indicative of an empty level within the vessel, for receiving the acoustic signals and producing a second electrical signal corresponding to the acoustic signals received by the second acoustic emission transducer means, said wall of the vessel forming an acoustic waveguide means; and electrical signal processing means, connected to said first and second acoustic emission transducer means, for evaluating said first and second electrical signals to determine the actual level of the bulk material in the vessel within said range of levels.

7. The device of claim 6 wherein the electrical signal processing means evaluates said first and second electrical signals to determine a characteristic of said electrical signals that is indicative of an arrival time of the acoustic signals at each of said first and second acoustic emission transducers, said electrical signal processing means determining the level of the bulk material in the vessel in accordance with the arrival time.

8. The device of claim 7 wherein said electrical signal processing means produces a histogram from the first and second electrical signals, said histogram indicating the level of bulk material in the vessel.

9. The device of claim 6 wherein said first and second acoustic emission transducers passively detect the acoustic signals.

10. A method for measuring a level of a bulk material in a vessel during a filling or emptying process in accordance with acoustic signals produced by the bulk material during the filling or emptying process, said bulk material moving through a range of levels in the vessel, said method comprising the steps of:

detecting the acoustic signals and producing a corresponding first electrical signal with a first transducer disposed on an external surface of a wall of the vessel at a location that is indicative of a full level within the vessel;

detecting the acoustic signals and producing a corresponding second electrical signal with a second transducer disposed on the external surface of rail wall of the vessel at a location that is indicative of an empty level within the vessel, said wall of the vessel forming an acoustic waveguide means; and analyzing said first and second electrical signals to determine the actual level of the bulk material in the vessel from characteristics of said first and second electrical signal within said range of levels.

* * * * *